United States Patent
Gravano-Doerffler

(10) Patent No.: US 9,243,170 B2
(45) Date of Patent: Jan. 26, 2016

(54) ADHESIVE MANUFACTURING PROCESS, ADHESIVE, AND ARTICLE

(71) Applicant: Tyco Electronics Corporation, Berwyn, PA (US)

(72) Inventor: Stefanie M. Gravano-Doerffler, Union City, CA (US)

(73) Assignee: Tyco Electronics Corporation, Berwyn, PA (US)

(*) Notice: Subject to any disclaimer, the term of this patent is extended or adjusted under 35 U.S.C. 154(b) by 81 days.

(21) Appl. No.: 14/010,398

(22) Filed: Aug. 26, 2013

(65) Prior Publication Data

US 2015/0056445 A1    Feb. 26, 2015

(51) Int. Cl.

| | |
|---|---|
| C09J 127/20 | (2006.01) |
| C08F 214/28 | (2006.01) |
| C09J 127/22 | (2006.01) |
| C09J 11/06 | (2006.01) |
| C08K 5/41 | (2006.01) |
| C08K 5/3445 | (2006.01) |
| C08F 8/30 | (2006.01) |
| C09J 127/16 | (2006.01) |
| C09J 127/18 | (2006.01) |

(52) U.S. Cl.
CPC .............. *C09J 127/22* (2013.01); *C08F 8/30* (2013.01); *C08K 5/3445* (2013.01); *C08K 5/41* (2013.01); *C09J 11/06* (2013.01); *C09J 127/16* (2013.01); *C09J 127/18* (2013.01); *Y10T 428/2852* (2015.01)

(58) Field of Classification Search
CPC ..... C08F 214/26; C08F 214/22; C08F 214/28
See application file for complete search history.

(56) References Cited

U.S. PATENT DOCUMENTS

| | | | | |
|---|---|---|---|---|
| 6,630,047 | B2 * | 10/2003 | Jing et al. | 156/272.2 |
| 2010/0324234 | A1 * | 12/2010 | Hung et al. | 526/90 |
| 2011/0171448 | A1 * | 7/2011 | Tang et al. | 428/220 |
| 2011/0218305 | A1 * | 9/2011 | Hintzer et al. | 525/376 |

FOREIGN PATENT DOCUMENTS

| | | | |
|---|---|---|---|
| EP | 650987 A1 * | 5/1995 | |
| WO | WO-03/051965 A1 | 6/2003 | |
| WO | WO-2010/021962 A2 | 2/2010 | |
| WO | WO 2011062961 A1 * | 5/2011 | |

OTHER PUBLICATIONS

Keppeler et al. "Inorganic-organic hybrid materials through post-synthesis modification: Impact of the treatment with azides on the mesopore structure", Beilstein Journal of Nanotechnology, 2011, 2, 486-498.*

International Search Report for International Application No. PCT/US2014/052367, mailed Dec. 5, 2014.

* cited by examiner

*Primary Examiner* — Nicole M Buie-Hatcher

(57) ABSTRACT

An adhesive manufacturing process, an adhesive, and an article are disclosed. The adhesive manufacturing process includes mixing THV with a polar aprotic solvent and sodium azide to form an adhesive having an azide group. The mixing is at about the melting point of the THV for a duration of at least about 24 hours. The adhesive includes THV having an azide group. The article includes a substrate and an adhesive positioned on the substrate, the adhesive comprising THV having an azide group.

16 Claims, 1 Drawing Sheet

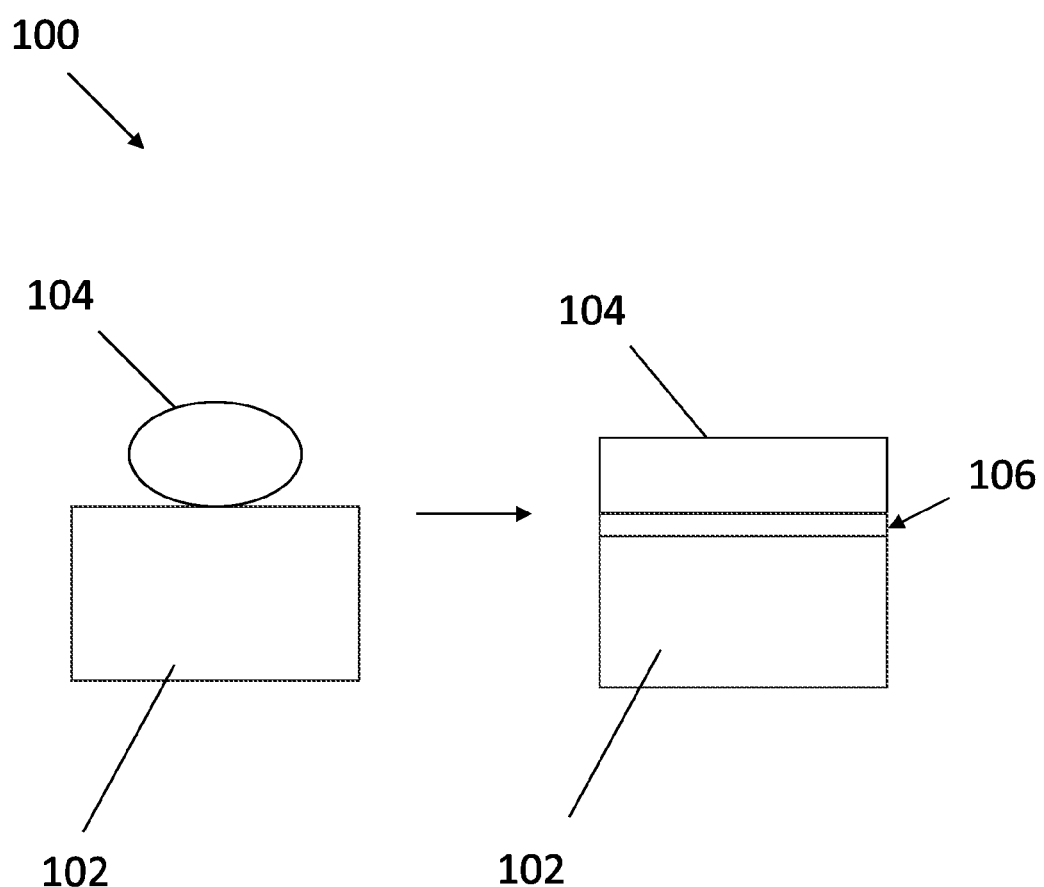

ADHESIVE MANUFACTURING PROCESS, ADHESIVE, AND ARTICLE

FIELD OF THE INVENTION

The present invention is directed to adhesives manufacturing, adhesives, and articles having adhesives. More particularly, the present invention is directed to azide-group-containing adhesive composition blends and articles including such blends.

BACKGROUND OF THE INVENTION

Adhesives are used in a variety of environments for a variety of applications. Such environments and applications require adhesives to have specific temperature profiles, viscosity profiles, chemical and flammable resistant profiles, and adhesion characteristics. Known adhesives do not adequately meet all of these requirements.

In wiring applications, adhesives can be used with fluoropolymers. Fluoropolymers have low surface energy, for example, below 25 dynes/cm. This low surface energy makes it difficult for an adhesive to bond to the fluoropolymer. Surface treatments can ameliorate this; however, surface treatments present other problems and are often not available in repair conditions. For example, chemical etching or high energy plasma treatment can be used to activate a fluoropolymer surface. However, etching chemicals (such as sodium naphthalene) cannot be used in a repair area due to the toxicity and flammability. Also, plasma equipment is not able to be used due to the crowded nature of a repair area.

Polytetrafluoroethylene surfaces can be especially difficult for adhesion. Certain polymeric materials are unable to diffuse into the surface, thereby resulting in a lack of adhesion. Polymeric materials that are able to diffuse into the surface may not have desired properties. For example, such materials may drip and/or have melting points being below a maximum service temperature.

Current adhesives do not desirably bond to polytetrafluoroethylene (PTFE). Positioning current adhesives in contact with a surface having PTFE creates a microgap and/or delamination between the adhesive and the PTFE surface.

Certain polymers can provide adhesion to fluoropolymers by having similar chemical structures, relatively low surface energies, and low melting points. Such polymers can have desirable flow and wet-ability on the fluoropolymers. However, such low melting temperatures result in dripping issues in high service temperature applications, such as aerospace applications. The dripping issues can cause seal failure.

Other fluoropolymers can provide adhesion to PTFE surfaces when the PTFE surfaces are etched, have an acid application, and/or are otherwise surface-modified. Such limitations render PTFE surfaces difficult to repair. In addition, such surface modifications can be undesirable by relying upon expensive or environmentally-unfriendly chemicals.

An adhesive manufacturing process, an adhesive, and article having an adhesive that do not suffer from one or more of the above drawbacks would be desirable in the art.

BRIEF DESCRIPTION OF THE INVENTION

In an exemplary embodiment, an adhesive manufacturing process includes mixing THV with a polar aprotic solvent and sodium azide to form an adhesive having an azide group. The mixing is above the melting point and below the degradation point of the THV and is for a duration of at least about 24 hours.

In another exemplary embodiment, an adhesive includes THV having an azide group.

In another exemplary embodiment, an article includes a substrate and an adhesive positioned on the substrate, the adhesive comprising THV having an azide group.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a schematic view of an article having an adhesive on a substrate, according to an embodiment of the disclosure.

DETAILED DESCRIPTION OF THE INVENTION

Provided are an exemplary adhesive manufacturing process, an adhesive, and an article having an adhesive. Embodiments of the present disclosure, for example, in comparison to articles and adhesives that do not include one or more of the features disclosed herein, are capable of use in specific temperature profiles, are capable of having predetermined viscosity profiles, have high adhesion characteristics (for example, with low surface energy surfaces), increased chemical resistance (for example, with low surface energy surfaces), increased dripping resistance (for example, with low surface energy surfaces), reduced or eliminated flammability, increased service temperature, or a combination thereof.

Referring to FIG. 1, in one embodiment, an article 100 includes a substrate 102 and an adhesive 104. The adhesive 104 penetrates into a diffusion region 106 of the substrate 102. The article 100 includes any suitable material permitting the adhesive 104 to be secured to the article 100. Suitable materials include, but are not limited to, aluminum, ethylene tetrafluoroethylene wire, a fluoropolymer, tape, heat-recoverable tubing (for example, 200° C. heat-recoverable tubing), mold parts, metal surfaces, wire, cable, tubing, and combinations thereof.

The adhesive 104 is applied to the substrate 102 at any suitable temperature for any suitable duration. Suitable temperatures include, but are not limited to, about 200° C., about 250° C., about 300° C., between about 200° C. and about 300° C., between about 300° C. and about 350° C., or any suitable combination, sub-combination, range, or sub-range therein. Suitable durations include, but are not limited to, between about 1 minute and about 20 minutes.

The adhesive 104 includes properties corresponding to the desired application, for example, having resistance to fluids (including or not including ketones), being wettable on perfluoropolymer substrates, other suitable properties, or a combination thereof.

The adhesive is manufactured by mixing a fluoropolymer, such as tetrafluoroethylene-co-hexafluoropropylene-co-vinylidene fluoride terpolymer (hereinafter "THV") with an azide-group forming material, such as sodium azide, having a melting point of about 275° C. and a density of 1.85 g/ml, under suitable conditions, for example, in a solvent, such as dimethyl sulfoxide and/or 1,3-Dimethyl-2-imidazolidinone. Other embodiments use other polar aprotic solvents and/or azide salts. In one embodiment, the fluoropolymer generally includes one or both of the following fluoropolymer structures:

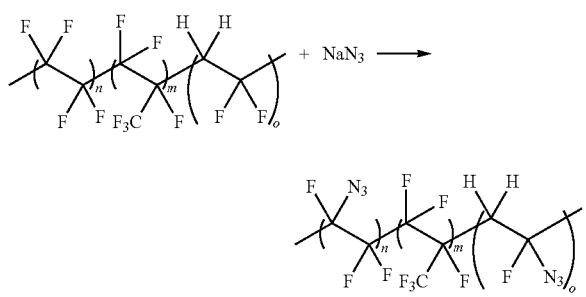

In general, suitable fluoropolymers include, but are not limited to, THV, polyvinylidene, ethylene tetrafluoroethylene, fluorinated ethylene-propylene, any suitable thermoplastic fluoropolymer, any suitable thermoset elastomer, or a combination thereof.

The melting point of the fluoropolymer corresponds to the selected fluoropolymer. In one embodiment, the melting point of the fluoropolymer is about 120° C., for example, at or at about 1 atmosphere. The degradation point of the fluoropolymer also corresponds to the selected fluoropolymer. In one embodiment, the degradation point of the fluoropolymer is about 300° C., for example, at or at about 1 atmosphere.

In one embodiment, the mixing is for a duration, for example, of between about 24 hours and about 120 hours, between about 24 hours and about 96 hours, between about 24 hours and about 72 hours, between about 24 hours and about 48 hours, between about 48 hours and about 120 hours, between about 48 hours and about 96 hours, between about 48 hours and about 72 hours, between about 72 hours and about 120 hours, between about 72 hours and about 96 hours, between about 96 hours and about 120 hours, about 24 hours, about 48 hours, about 72 hours, about 96 hours, about 120 hours, or any suitable combination, sub-combination, range, or sub-range therein.

The fluoropolymer and the azide-group forming material are at any suitable concentration permitting the fluoropolymer to be modified to include the azide group. Suitable ratios, by weight, include, but are not limited to, 11 to 1, 10 to 1 (fluoropolymer to azide-group forming material), 19.75 to 2.13, 9 to 1, 8 to 1, or any suitable combination, sub-combination, range, or sub-range therein.

The azide group attaches to any suitable portion of the fluoropolymer, for example, through an SN2 reaction. In one embodiment, the azide group is attached to a tertiary carbon of the fluoropolymer. In one embodiment, the azide group is attached to a secondary carbon of the fluoropolymer. In one embodiment, the azide group is attached to a primary carbon of the fluoropolymer. In further embodiments, a plurality of the azide groups is attached to one or more primary carbons, secondary carbons, tertiary carbons, or a combination thereof.

Upon modifying the fluoropolymer to include the azide group, the fluoropolymer has increased adhesion. For example, in one embodiment, adhesion to aluminum and/or PTFE of the THV having the azide group is higher in comparison to adhesion of the THV without the azide group, based upon a linear peel test.

EXAMPLES

In a first example, a comparative example, 19.75 grams of a fluoropolymer (specifically, FEP 9810 having a melting point of about 260° C., available from DuPont of Wilmington, Del.) is mixed with 128 ml of a solvent (specifically, dimethyl sulfoxide) and 2.13 grams of sodium azide at a temperature of about 80° C. The solution is yellow in color. After a period of about 120 hours, the mixture is washed to remove any unreacted azide groups, but no azide group is recognized on the fluoropolymer based upon infrared spectroscopy.

In a second example, a comparative example, 19.75 grams of a fluoropolymer (specifically, FEP 9810 having a melting point of about 260° C., available from DuPont of Wilmington, Del.) is mixed with 128 ml of a solvent (specifically, dimethyl sulfoxide) and 2.13 grams of sodium azide at a temperature of about 100° C. The solution is yellow in color. After a period of about 120 hours, the mixture is washed to remove any unreacted azide groups, but no azide group is recognized on the fluoropolymer based upon infrared spectroscopy.

In a third example, a comparative example, 19.75 grams of a fluoropolymer (specifically, FEP 9810 having a melting point of about 260° C., available from DuPont of Wilmington, Del.) is mixed with 128 ml of a solvent (specifically, dimethyl sulfoxide) and 2.13 grams of sodium azide at a temperature of about 120° C. The solution is yellow in color. After a period of about 120 hours, the mixture is washed to remove any unreacted azide groups, but no azide group is recognized on the fluoropolymer based upon infrared spectroscopy.

In a fourth example, a comparative example, 19.75 grams of a fluoropolymer (specifically, THV 221G having a melting point of 120° C., a compound of THV available from 3M of Oakdale, Minn.) is mixed with 128 ml of a solvent (specifically, dimethyl sulfoxide) and 2.13 grams of sodium azide at a temperature of about 80° C. The solution is yellow in color. After a period of about 120 hours, the mixture is washed to remove any unreacted azide groups, but no azide group is recognized on the fluoropolymer based upon infrared spectroscopy.

In a fifth example, a comparative example, 19.75 grams of a fluoropolymer (specifically, THV 221G having a melting point of 120° C., a compound of THV available from 3M of Oakdale, Minn.) is mixed with 128 ml of a solvent (specifically, dimethyl sulfoxide) and 2.13 grams of sodium azide at a temperature of about 100° C. The solution is yellow in color. After a period of about 120 hours, the mixture is washed to remove any unreacted azide groups, but no azide group is recognized on the fluoropolymer based upon infrared spectroscopy.

In a sixth example, corresponding to an embodiment of the disclosure, 19.75 grams of a fluoropolymer (specifically, THV 221G having a melting point of 120° C., a compound of THV available from 3M of Oakdale, Minn.) is mixed with 128 ml of a solvent (specifically, dimethyl sulfoxide) and 2.13 grams of sodium azide at a temperature of about 120° C. The solution is yellow in color. After a period of about 120 hours, the mixture is washed to remove any unreacted azide groups, an azide group is recognized on the fluoropolymer based upon infrared spectroscopy, and the solution appears brown. Although not intending to be bound by theory, it is believed that the formation of the azide group is facilitated by reaching the melting point of the fluoropolymer.

In a seventh example, corresponding to an embodiment of the disclosure, 19.75 grams of a fluoropolymer (specifically, THV 221G having a melting point of 120° C., a compound of THV available from 3M of Oakdale, Minn.) is mixed with 128 ml of a solvent (specifically, dimethyl sulfoxide) and 2.13 grams of sodium azide at a temperature of about 150° C. The solution is yellow in color. After a period of about 120 hours, the mixture is washed to remove any unreacted azide groups, an azide group is recognized on the fluoropolymer based upon infrared spectroscopy, and the solution appears brown. Although not intending to be bound by theory, it is believed that the formation of the azide group is facilitated by reaching the melting point of the fluoropolymer.

In an eighth example, corresponding to an embodiment of the disclosure, 19.75 grams of a fluoropolymer (specifically, THV 2030 having a melting point of 130° C., a compound of THV available from 3M of Oakdale, Minn.) is mixed with 128 ml of a solvent (specifically, dimethyl sulfoxide) and 2.13 grams of sodium azide at a temperature of about 150° C. The solution is yellow in color. After a period of about 120 hours, the mixture is washed to remove any unreacted azide groups, an azide group is recognized on the fluoropolymer based upon infrared spectroscopy, and the solution appears brown. Although not intending to be bound by theory, it is believed that the formation of the azide group is facilitated by reaching the melting point of the fluoropolymer.

In a ninth example, corresponding to an embodiment of the disclosure, 19.75 grams of a fluoropolymer (specifically, ethylene-tetrafluoroethylene having a melting point of 265° C.) is mixed with 128 ml of a solvent (specifically, 1,3-dimethyl-2-imidazolidinone) and 2.13 grams of sodium azide at a temperature of about 270° C. The solution is yellow in color. After a period of about 120 hours, the mixture is washed to remove any unreacted azide groups, an azide group is recognized on the fluoropolymer based upon infrared spectroscopy, and the solution appears brown. Although not intending to be bound by theory, it is believed that the formation of the azide group is facilitated by reaching the melting point of the fluoropolymer.

In a tenth example, a comparative example, 19.75 grams of a fluoropolymer (specifically, FEP 9810 having a melting point of 260° C., available from DuPont of Wilmington, Del.) is mixed with 128 ml of a solvent (specifically, 1,3-dimethyl-2-imidazolidinone) and 2.13 grams of sodium azide at a temperature of about 270° C. The solution provided inconclusive information on whether the reaction formed an azide group.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An adhesive manufacturing process, comprising,
   mixing THV with a polar aprotic solvent and sodium azide to form an adhesive having an azide group;
   wherein the mixing is above the melting point and below the degradation point of the THV and is for a duration of at least about 24 hours; and
   wherein the melting point is about 120° C.

2. The adhesive manufacturing process of claim 1, wherein the THV is, by weight, at a concentration ratio of about 10 to 1 in comparison to the sodium azide.

3. The adhesive manufacturing process of claim 1, wherein the duration is at least about 48 hours.

4. The adhesive manufacturing process of claim 1, wherein the duration is about 120 hours.

5. The adhesive manufacturing process of claim 1, wherein the polar aprotic solvent is dimethyl sulfoxide.

6. The adhesive manufacturing process of claim 1, wherein the polar aprotic solvent is 1,3-dimethyl-2-imidazolidinone.

7. The adhesive manufacturing process of claim 1, wherein the azide group is attached to a tertiary carbon of the THV.

8. The adhesive manufacturing process of claim 1, wherein the azide group is attached to a secondary carbon of the THV.

9. The adhesive manufacturing process of claim 1, wherein the azide group is attached to a primary carbon of the THV.

10. The adhesive manufacturing process of claim 1, wherein the azide group is attached to the THV through a SN2 reaction.

11. The adhesive manufacturing process of claim 1, further comprising positioning the adhesive on aluminum.

12. The adhesive manufacturing process of claim 11, wherein adhesion of the adhesive on the aluminum is greater than adhesion from a comparative THV without the azide group.

13. The adhesive manufacturing process of claim 1, further comprising positioning the adhesive on polytetrafluoroethylene.

14. The adhesive manufacturing process of claim 13, wherein adhesion of the adhesive on the polytetrafluoroethylene is greater than adhesion from a comparative THV fluoride without the azide group.

15. The adhesive manufacturing process of claim 13, wherein the polytetrafluoroethylene is devoid of surface modifications.

16. The adhesive manufacturing process of claim 13, wherein the polytetrafluoroethylene has surface modifications, said surface modifications are selected from the group consisting of etching, acid application, and combinations thereof.

* * * * *